April 4, 1950     K. E. JAMES     2,502,789
METHOD OF MOLDING CONCRETE PIPES
Filed April 2, 1948     3 Sheets-Sheet 1
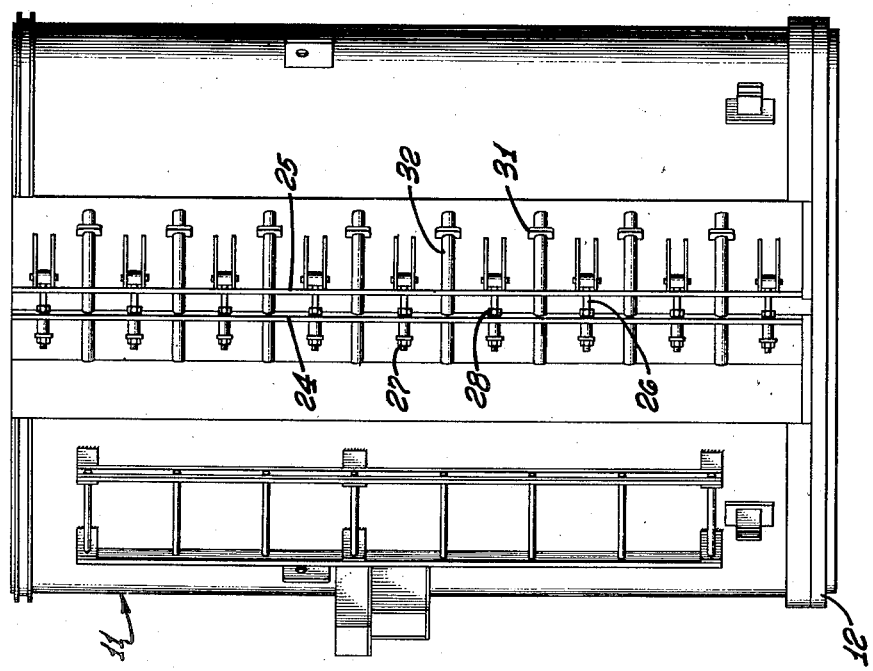
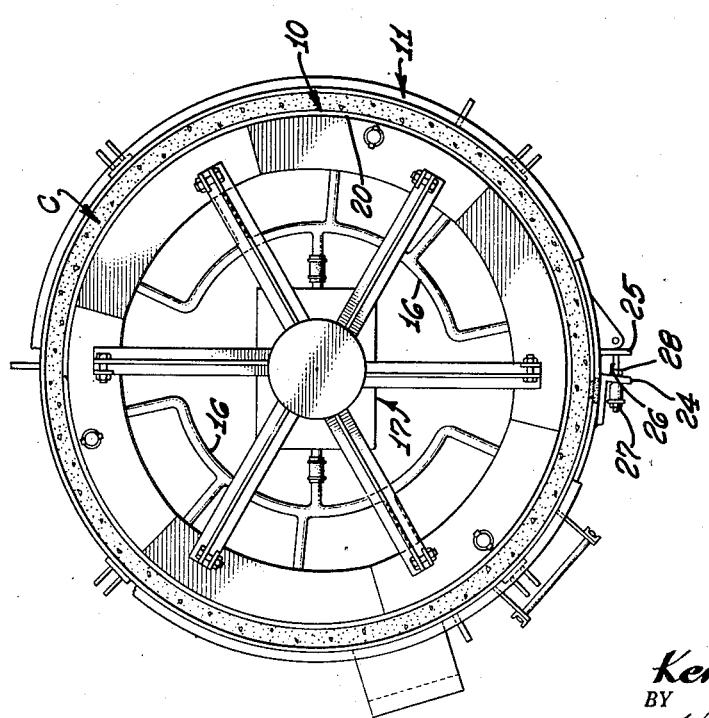
INVENTOR,
Kenneth E. James
BY
Hazard & Miller
ATTORNEYS

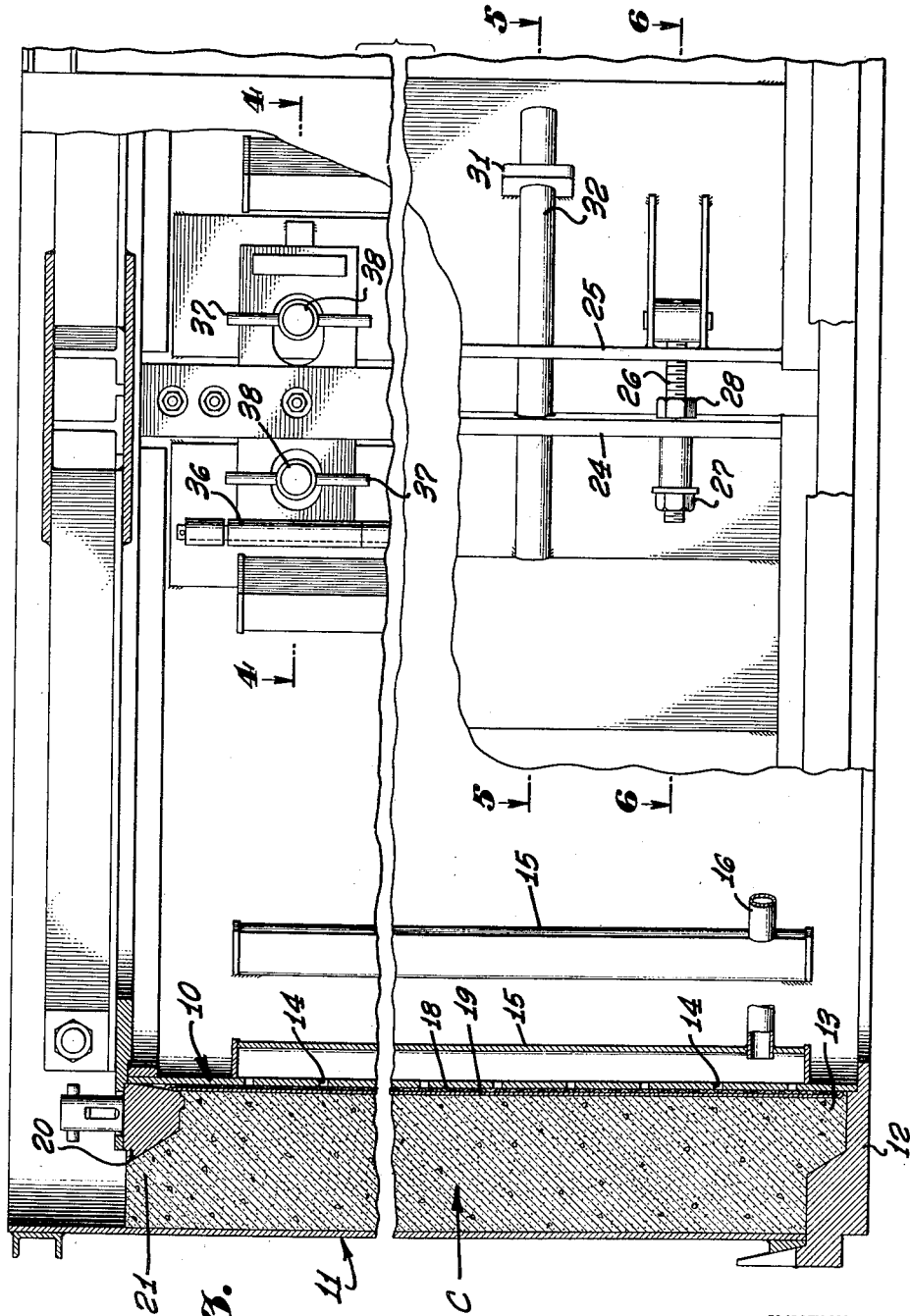

Patented Apr. 4, 1950

2,502,789

UNITED STATES PATENT OFFICE 2,502,789

METHOD OF MOLDING CONCRETE PIPES

Kenneth E. James, Covina, Calif.

Application April 2, 1948, Serial No. 18,556

1 Claim. (Cl. 25—154)

This invention relates to method of molding cementitious materials particularly those employing hydraulic cements.

It has long been known that the strongest cement is that which has added thereto only the water required for hydration of the cement. In the usual situation, however, water considerably in excess of that required for hydration of the cement is added to the mix to facilitate placement in the mold and to facilitate the complete filling of the mold. It has heretofore been proposed to subject the cementitious material after it has been placed in the mold to a vacuum with the idea of extracting the excess water after the cementitious material has been placed. However, where the article molded must meet certain dimensional requirements the use of vacuum extraction has ordinarily been regarded as impractical due to the fact that when the water is extracted the remaining cementitious material in the mold will shrink and no longer conform to the dimensions required.

An object of the present invention is to provide a method for molding various objects such as for example concrete pipe wherein the cementitious material can have adequate amounts of water mixed therewith to facilitate its placement in the mold. Thereafter a vacuum may be applied to extract excess water which will necessarily involve a shrinkage of the cementitious material volumetrically. However, by contracting or adjusting certain walls of the mold the interior of the mold may be volumetrically contracted to compensate for the shrinkage so that the shrinkage will not be apparent in a dimension that it is desired to maintain. In this manner the molded article may have the desired dimensions and formations and the cementitious material, on setting, will be adequately strong in that it has been allowed to set under conditions wherein the excess water has been removed.

With the foregoing and other objects in view, which will be made manifest in the following detailed description and specifically pointed out in the appended claim, reference is had to the accompanying drawings for an illustrative embodiment of the invention, wherein:

Figure 1 is a top plan view of a mold for forming concrete pipe embodying the present invention;

Fig. 2 is a view in front elevation of the same;

Figure 4:
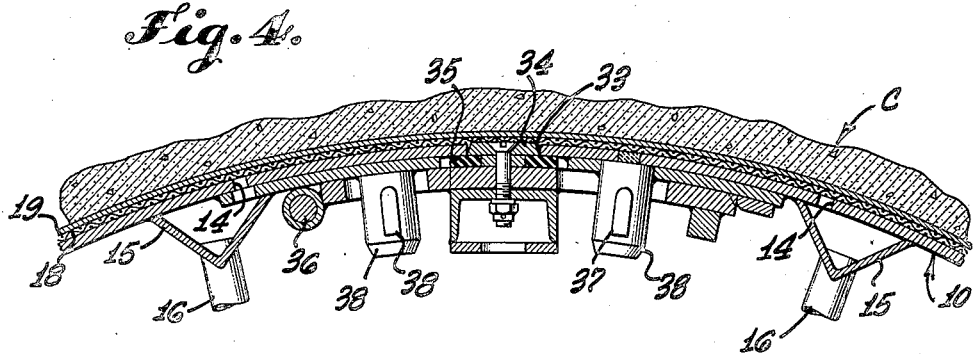
Figure 5:
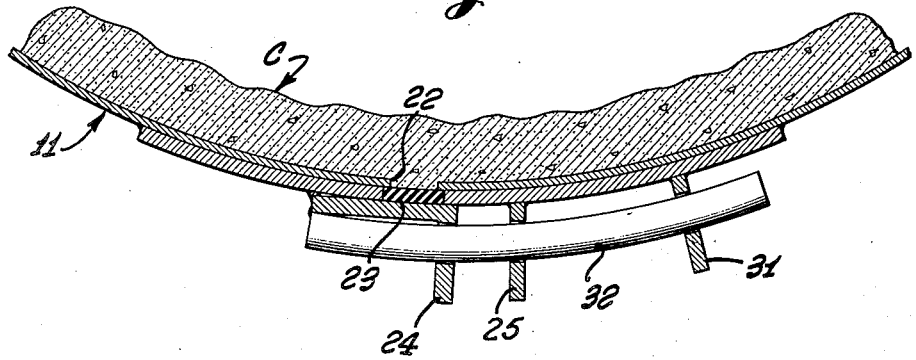
Figure 6:
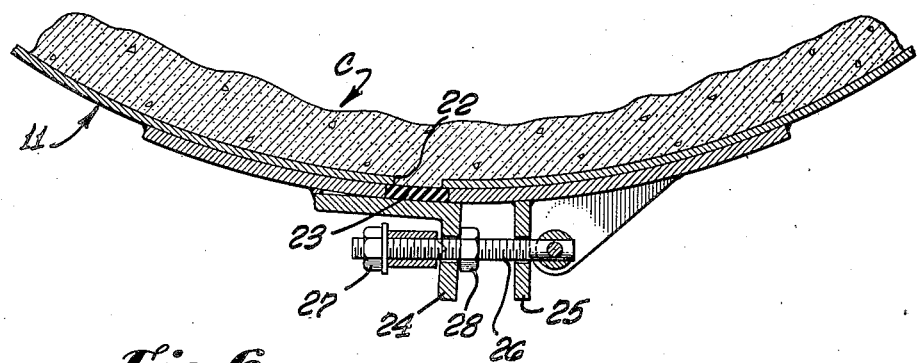

Fig. 3 is a view on an enlarged scale of the mold shown in Fig. 2, parts being broken away and shown in vertical section; and Figs. 4, 5 and 6 are horizontal, partial sections taken substantially upon the lines 4—4, 5—5 and 6—6, respectively, in the directions indicated.

Referring to the accompanying drawings wherein similar reference characters designate similar parts throughout, it will be understood that the present invention is highly useful in the construction of concrete pipe but is not necessarily restricted thereto and may be used in the molding of other articles. The mold illustrated consists of a hollow cylindrical mold, the inner wall of which is generally indicated at 10 and the outer wall of which is generally indicated at 11. The spacing between these walls determines the thickness of the concrete pipe to be produced. These walls are positioned on a suitable base 12 which may be so formed as to shape the spigot 13 on one end of the pipe. The inner wall 10 is perforated with perforations 14 which are preferably arranged in vertical rows, each row communicating with the interior of a manifold 15. The various manifolds are connected such as by tubes 16 to a source of vacuum such as, for example, a vacuum pump generally indicated at 17. The purpose of this vacuum pump is to create partial vacuum within the various manifolds and to thus, in effect, suck excess water out of the concrete or cementitious material C that is placed in the mold. As a means for retaining the concrete mass in the mold and preventing its being drawn through the perforations 14, the inner wall 10 may be covered with a layer of screen 18 over which there may be positioned canvas indicated at 19. The screen and canvas serve to permit the excess water to be drawn therethrough but at the same time to retain the cement and sand in the mold. The perforations 14 are preferably adequately distributed over the interior of the mold so that the entire mass of concrete will be subjected to vacuum. On the upper end of the inner wall there may be supported a ring 20 which is of such cross sectional shape as to form the bell end 21 on the upper end of the pipe to be formed which is complementary to the spigot 13.

The outer wall 11 is contractible, being vertically split as indicated at 22. Across this split there is positioned a section of compressible material 23 such as rubber, Neoprene or the like. At suitable intervals along the height of the mold there are ears 24 and 25 at the sides of the split. The ears 25 have bolts 26 mounted thereon which extend through the ears 24. These bolts are equipped with nuts 27 on the outer sides of the ears 24 and nuts 28 on the inner sides of the ears 24. On tightening the nuts 27 the ears 24 may be drawn toward the ears 25 to, in effect, close the split 22. The nuts 28 can be adjusted to act as adjustable stops limiting the closing movement of the outer wall of the mold. During the contraction of the outer wall the compressible material 23 merely compresses and functions as a compressible dam preventing the escape of the concrete through the split 22.

Between the various contracting bolts 26 the outer mold may also be provided with ears 31 at suitable intervals. The ears 24 carry curved bars 32 that are slidable in the ears 25 and 31. These bars merely assist in holding the sides of the outer wall 11 adjacent the split in position while permitting the outer wall to be contracted.

The inner wall 10 may also be made such that it can be contracted in order to facilitate removal of the inner wall or core after the concrete has set and to this end the inner wall may be split as at 33. This split is largely closed by means of an elongated metal plate 34 that enters between the sides of the split and which is backed by means of a rubber gasket 35. The plate 34 and the gasket 35 may be hingedly mounted on the inner face of the inner wall of the mold as by hinges 36 so that when the plate and gasket are swung inwardly the inner wall 10 of the mold can be contracted to facilitate its removal. However, in the normal position the plate and gasket are held in the position shown by means of tapered pins 37 which are driven through slots in bosses 38 on the inner mold.

In carrying out the method embodying the present invention with the improved apparatus, it will be understood that it is desirable to maintain the vertical or axial dimension of the pipe section that is to be produced. This may be of primary importance so that the bell and spigot ends of the pipe will be fully and completely formed. On the other hand, if the pipe does not have bell and spigot ends there may be other considerations that require each length of pipe to be exact. In the usual situation the internal diameter of the pipe must be maintained but the wall thickness need not be maintained as long as the walls are adequately strong. Likewise the external diameter of the pipe need not be maintained. With the mold set up as above described the concrete C may be positioned in the mold in any suitable manner and in order to facilitate its placement in the mold and the complete filling of the mold, water greatly in excess of that required for hydration of the cement may be added to the mix. After the mold has been filled the vacuum is applied to the mold contents through the manifolds 15 to draw out or suck out through the apertures 14 the excess water. Simultaneously with the sucking out of the excess water or at regular intervals of time the contracting bolts 26 are tightened by screwing up the nuts 27. This causes the walls of the outer mold to contract circumferentially to compensate for the shrinkage occasioned by the loss of water extracted by the vacuum. Consequently, although the concrete C will decrease volumetrically the decrease in volume is compensated for by the contracting outer wall of the mold so that the vertical or axial dimension of the pipe between the bell end 21 and the spigot end 13 is constantly maintained. There will, therefore, always be adequate concrete around the ring 20 to form a full and complete bell end on the pipe for the reception of the spigot 13 of an adjacent pipe section. The contracting of the outer wall continues until the vacuum is unable to extract or suck out any more water and the concrete is then allowed to completely set. After having set the outer wall can then be expanded by backing off nuts 27 and the inner wall 10 can be contracted by swinging the plate 34 inwardly. The inner and outer walls of the mold can then be removed and the pipe section thus procured.

From the above described construction it will be appreciated that the improved method and apparatus enables molded articles to be produced wherein the cementitious material is subjected to vacuum for the purpose of extracting excess water and securing a dense, strong concrete. The shrinkage involved, however, is confined by the simultaneous contraction of the outer wall of the mold so that it is not apparent in the vertical or axial dimensions of the pipe but instead is confined to the thickness dimension which, in the usual situation, is not of any great consequence. It will be appreciated that where pipe must be produced wherein the exterior diameter of the pipe must be maintained, instead of contracting the outer wall of the mold the inner wall may be expanded to thus compensate for the shrinkage.

Various changes may be made in the details of construction without departing from the spirit and scope of the invention as defined by the appended claim.

I claim:

The method of molding concrete pipe which comprises placing cementitious material in a hollow cylindrical mold, applying a vacuum to the material through the inner walls of the mold, and simultaneously contracting the external wall of the mold to prevent the shrinkage due to the vacuum being apparent in an axial direction.

KENNETH E. JAMES.

REFERENCES CITED

The following references are of record in the file of this patent:

UNITED STATES PATENTS

| Number | Name | Date |
|---|---|---|
| 1,072,495 | Priest | Sept. 9, 1913 |
| 1,152,334 | Martin | Aug. 31, 1915 |
| 1,278,479 | Kellar | Sept. 10, 1918 |
| 2,196,874 | Ruegg | Apr. 9, 1940 |
| 2,317,997 | Lapidus | May 4, 1943 |